United States Patent [19]

Seiber

[11] Patent Number: 4,584,745
[45] Date of Patent: Apr. 29, 1986

[54] DOUBLE ANGLED PRECISION FILE

[76] Inventor: Arvie I. Seiber, Redwood Creek, Blue Lake, Calif. 95525

[21] Appl. No.: 577,564

[22] Filed: Feb. 6, 1984

[51] Int. Cl.[4] .......................................... B23D 71/00
[52] U.S. Cl. ......................................................... 29/78
[58] Field of Search ...................................... 29/78, 79

[56] References Cited

U.S. PATENT DOCUMENTS

| 633,523 | 9/1899 | Lytle | 29/78 |
| 2,687,562 | 8/1954 | Noll | 29/78 |

FOREIGN PATENT DOCUMENTS

| 524889 | 9/1921 | France | 29/78 |
| 26410 | 7/1902 | Switzerland | 29/78 |
| 58256 | 1/1912 | Switzerland | 29/78 |

Primary Examiner—Leonidas Vlachos
Attorney, Agent, or Firm—Thomas E. Schatzel

[57] ABSTRACT

A precision file for sharpening saw teeth. The file includes a flattened oblong cross section for exact shaping of the saw teeth. Two sets of single cut teeth are cut into the file and extend over the file's longitudinal axis. A first set of teeth extends from a central lateral axis outward toward one end of the file, and a second set extends from the central axis outward towards the file's second end. The file is thus capable of an extensor cutting stroke using either end.

3 Claims, 6 Drawing Figures

U.S. Patent    Apr. 29, 1986    4,584,745
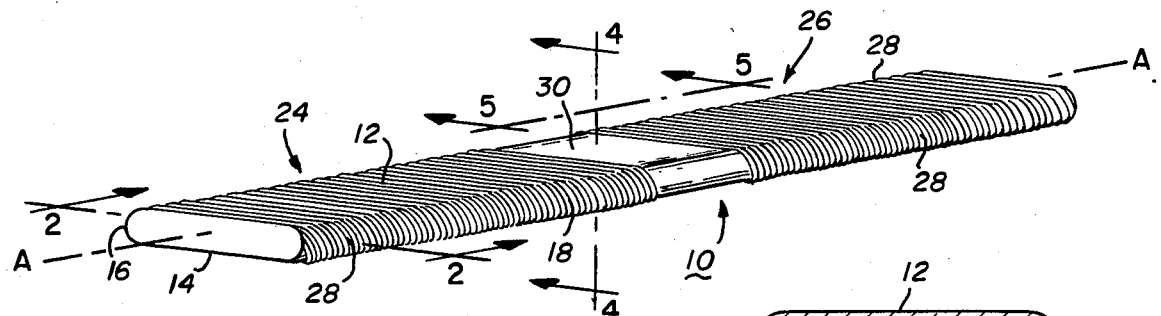
Fig_1
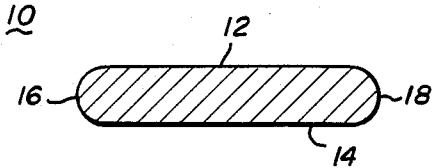
Fig_2
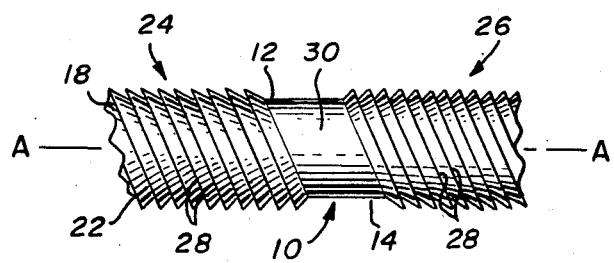
Fig_3
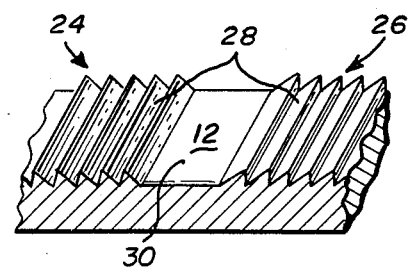
Fig_4
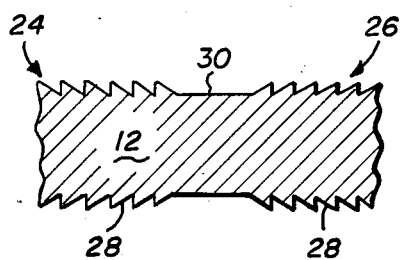
Fig_5
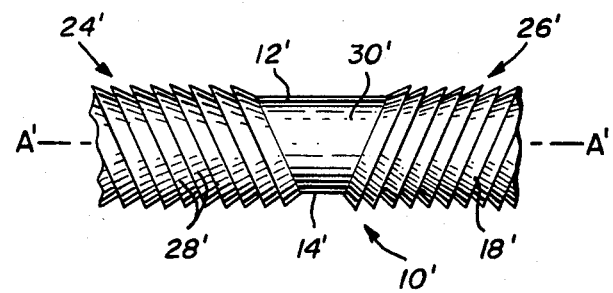
Fig_6

DOUBLE ANGLED PRECISION FILE

BACKGROUND OF THE INVENTION

1. Field of the Invention

This invention relates generally to a file for cutting metal, and more particularly to a double angled precision file for sharpening chain saw teeth.

2. Description of the Prior Art

Metal files are currently available in a variety of shapes and with a number of teeth configurations for various metal cutting and shaping applications. Such files are classified according to their shape or cross section and according to their teeth pitch, spacing and cut. The shape or contour may be tapered or it may be uniform about the file's longitudinal axis. The latter shape is defined as blunt. Teeth configurations are designated as single or double cut, rasped or curved. The single cut file has teeth of a uniform size, angle and spacing. The cut depth is relatively shallow and the teeth are closely spaced which produces a smooth finish on the workpiece. Double cut files have two separate sets of teeth, one of which is typically of a coarser cut. Rasp and curved cut files have more deeply cut, wider spaced teeth and are designed for rapid removal of metal. Chain saw files typically are of rectangular, square, round or diamond-shaped sections and may be either double or single cut. The single cut is preferred as these files are used for finishing purposes, although a double cut file may also be employed for finishing purposes. The shape of the file is determined by the type of the chain saw blade to be sharpened; usually a round, hexagonal or triangular cross-section is employed.

Existing files include a cut portion extending approximately three-quarters of the file's length with the remaining uncut portion tapering into a shoulder and handle.

The filing action requires a length of the file to be pushed or drawn across the work. Usually a stroke of several inches is employed for a smooth finish. It is apparent that with existing files having an uncut handle, the handle and the adjacent cut portion will be unused in the filing motion. Because only the file's distal half is used on the work, this half wears out first, rendering the file unusable despite the remaining unworn portions. Even files which are fully cut are not fully utilizable for such precision work. This is because the cut is angled in one direction, and is uniform over the length of the file. The file is thus adapted for filing in one direction only and one cannot simply turn the file around and use the other half because the teeth will be running in the wrong direction. Sharpening chain saw teeth requires a precise stroke to attain the necessary smoothness and sharpness. Additionally, the relative hardness of the chain saw teeth tends to quickly wear a sharpening file.

None of the prior art has solved the problem of non-uniform wear in a precision chain saw sharpening file.

SUMMARY OF THE PRESENT INVENTION

It is therefore an object of the present invention to provide a file which may be utilized about a greater proportion of its surface area.

It is a further object of the present invention to provide a precision file specifically designed for sharpening chain saw teeth.

Briefly, a preferred embodiment of the present invention includes a flat metal blank having an elongated oblong cross section comprising an upper and a lower flat surface, and two hemispherical side faces. A multiplicity of teeth are cut into the blank about each face and extend over substantially the entire length of the file. The teeth cut into the top and bottom flat surfaces are cut perpendicularly with the file's longitudinal axis and are parallel with each other. The teeth cut on each of the two hemispherical side faces are angled at an approximately twenty degree angle from the vertical. The file is divided about a central lateral axis into a front half and a back half. The teeth on each half are facing outward towards each end such that each half has a cutting stroke in the extensor direction.

It is an advantage of the present invention that the file is cut bidirectionally so that both ends may be used in a cutting stroke.

It is a further advantage that the file includes a plurality of faces for exact shaping of a workpiece.

It is an additional advantage that the teeth are angled to control clogging.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a perspective view of a file of the present invention;

FIG. 2 is a front elevational view, taken along line 2—2 of FIG. 1;

FIG. 3 is a detailed side elevational view of the file of FIG. 1;

FIG. 4 is a partially sectioned perspective view, taken along line 4—4 of FIG. 1;

FIG. 5 is a top sectional view, taken along line 5—5 of FIG. 1; and

FIG. 6 is a detailed side elevational view of an alternative embodiment of the file of the present invention.

DETAILED DESCRIPTION OF THE PREFERRED EMBODIMENT

FIG. 1 illustrates a file of the present invention and referred to by the general reference character 10. The file 10 includes an upper and a lower flat face 12 and 14, and a right and a left hemispherical side face 16 and 18. The file 10 is divided into a front half 24 and a back half 26. A multiplicity of single cut teeth 28 are cut into each face of each half 24 and 26. Intermediate to the two halves 24 and 26 containing the teeth 28 is a central uncut portion 30. The file 10 is uniform in contour and, for the particular embodiment used for sharpening chain saw blades, is approximately nine inches long, one-half an inch wide and one-eighth of an inch thick. The flattened oblong cross-sectional shape of the file 10 is illustrated in FIG. 2. The teeth 28 which are cut into the upper and lower flat faces 12 and 14 are perpendicular to a longitudinal axis A of the file 10 and are parallel with each other. The teeth 28 cut into the hemispherical side faces 16 and 18 are cut on an angle of approximately twenty degrees from a vertical axis. Each tooth 28 on each hemispherical side face 16 and 18 smoothly follows the contour of such face of the file 10 such that there are no sharp directional changes. The hemispherical shaping of the faces 16 and 18 allows for precise sharpening of a typical chisel-cut chainsaw, and the smooth and uniform angling of the teeth 28 cut into side faces 16 and 18 aids in controlling clogging. This angling of the side teeth 28 is further illustrated in FIG. 3. As shown in section in FIGS. 4 and 5, the teeth 28 are further cut into each half 24 and 26 in opposing, outward-facing directions such that the file is divided into two mirror image halves by the central uncut poriton 30. As with the teeth 28 cut into the upper and lower flat faces 12 and 14, the teeth 28 cut into the hemispherical side faces 16 and 18 are also parallel with each other. Spacing of the teeth 28 is approximately fifty to the inch. The file 10 is constructed of a strong yet slightly resilient material such as steel, and in the preferred embodiment is constructed of carbon steel for durability and precision of cut.

An alternative embodiment of the file of the present invention is illustrated in FIG. 6 and designated by the general reference character 10'. Those elements of the alternative embodiment which are common to the preferred embodiment carry the same reference numeral distinguished by a prime designation. The file 10' is similar to the file 10 with the exception of the angle of the teeth 28' cut into the hemispherical side faces 16' and 18' of back half 26'. These teeth are not parallel with the teeth 28' of hemispherical side faces 16' and 18' of front half 24' but reverse direction at the junction of the two halves 24' and 26' and are angled approximately twenty degrees from the vertical in the opposite direction.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A file for cutting metal of chainsaw chisel-cut teeth comprising:

a flat metal blank having a first and a second terminal end and including an upper and a lower flat surface, said upper and lower flat surfaces including a multiplicity of single cut teeth cut thereinto and with each tooth extending the full width of the blank, said teeth being cut perpendicular to a longitudinal axis of said blank, and parallel to each other, and extending from a center portion of said blank facing toward said first terminal end and further extending from said center facing in an opposite direction toward said second terminal end in a tandem configuration, said blank further including a left and a right hemispherical side face whereby a flattened oblong cross-section is formed with said upper and lower flat surfaces, said hemispherical sides faces including a multiplicity of teeth cut thereinto, said side face teeth being cut at an angle from a vertical axis of approximately twenty degrees, and extending from said center portion of said blank toward said first end, and further extending from said center portion toward said second terminal end in a tandem configuration, said angle and direction of cut being uniform along the file's longitudinal axis;

whereby a double-ended file is formed, having teeth adapted for an extensor cutting stroke on either end.

2. The file according to claim 1 wherein said teeth are cut approximately fifty to 20 the inch.

3. In combination with a chainsaw chisel-cut file having a blunt contour and flat upper and lower surfaces and hemispherical side surfaces describing a flattened oblong cross-section, with a multiplicity of parallel single-cut teeth cut into each of said surfaces, the improvement comprising a first set of teeth, each tooth of the first set being cut into said upper and lower flat surfaces perpendicularly to a longitudinal aixs of said file and further cut into said hemispherical side surfaces at an angle of approximately twenty degrees from a vertical axis, said first set of teeth being arranged in a tandem configuration beginning from a center portion of said longitudinal axis facing and extending toward a first terminal end thereof;

a second set of teeth, each tooth of the second set being cut into said upper and lower flat surfaces perpendicularly to said longitudinal axis and further cut into said hemispherical side surfaces at an angle of approximately twenty degrees from said vertical axis, said second set of teeth being arranged in a tandem configuration beginning from said center portion of said longitudinal axis facing and extending toward a second terminal end of said file, said said second set of teeth cut into said hemispherical side surfaces being opposite in direction from said first set of teeth being cut into said hemispherical side surfaces;

whereby a double-ended file is formed, having teeth cut for an extensor cutting stroke on either end.

* * * * *